United States Patent
Ohmori et al.

(10) Patent No.: US 8,058,318 B2
(45) Date of Patent: Nov. 15, 2011

(54) ACIDIC ZIRCONIA SOL AND PRODUCTION METHOD OF THE SAME

(75) Inventors: Yutaka Ohmori, Sodegaura (JP); Hirokazu Kato, Sodegaura (JP); Kenji Yamaguchi, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 12/687,566

(22) Filed: Jan. 14, 2010

(65) Prior Publication Data
US 2010/0120925 A1    May 13, 2010

Related U.S. Application Data

(62) Division of application No. 11/918,134, filed as application No. PCT/JP2006/307660 on Apr. 11, 2006, now Pat. No. 7,691,910.

(30) Foreign Application Priority Data

Apr. 18, 2005   (JP) ................................ 2005-119261

(51) Int. Cl.
   *C09K 3/00*   (2006.01)
(52) U.S. Cl. .......................................... 516/90; 516/11
(58) Field of Classification Search ...................... 516/90
   See application file for complete search history.

(56) References Cited

U.S. PATENT DOCUMENTS

| | | | |
|---|---|---|---|
| 2,984,628 A | 5/1961 | Alexander et al. | |
| 5,223,176 A | 6/1993 | Obitsu et al. | |
| 5,234,870 A | 8/1993 | Osaka et al. | |
| 2002/0004544 A1* | 1/2002 | Kolb et al. | ..................... 524/413 |

FOREIGN PATENT DOCUMENTS

| | | |
|---|---|---|
| JP | A-58-079818 | 5/1983 |
| JP | A-58-217430 | 12/1983 |
| JP | A-60-176920 | 9/1985 |
| JP | A-64-083519 | 3/1989 |
| JP | A-03-174325 | 7/1991 |
| JP | A-04-104910 | 4/1992 |
| JP | A-09-235119 | 9/1997 |
| JP | A-2001-089144 | 4/2001 |
| JP | A-2003-512287 | 4/2003 |

OTHER PUBLICATIONS

Li ("Making spherical zirconia particles from inorganic zirconium aqueous sols", Powder Technology vol. 137, Issues 1-2, Oct. 20, 2003, pp. 95-98, Powder Technology in China).*

* cited by examiner

*Primary Examiner* — Ling Choi
*Assistant Examiner* — Chun-Cheng Wang
(74) *Attorney, Agent, or Firm* — Oliff & Berridge, PLC

(57) ABSTRACT

There is provided an acidic zirconia sol having compatibility of particle properties and binding properties, and a production method of the same. The acidic zirconia sol includes zirconia particles (a) having a particle diameter ranging from 20 to 300 nm in a content of 90 to 50% by mass, based on the mass of all zirconia particles, and zirconia particles (b) having a particle diameter of less than 20 nm in a content of 10 to 50% by mass, based on the mass of all zirconia particles.

1 Claim, No Drawings

US 8,058,318 B2

ACIDIC ZIRCONIA SOL AND PRODUCTION METHOD OF THE SAME

CROSS REFERENCE TO RELATED APPLICATION

The present application is a divisional application of U.S. Patent Application No. 11/918,134, now U.S. Pat. No. 7,691,910, filed Feb. 8, 2008, which in turn is a U.S. national stage application of PCT/JP2006/307660, filed Apr. 11, 2006. Each of the prior applications is incorporated by reference herein in its entirety.

TECHNICAL FIELD

The present invention relates to an acidic and stable zirconia sol and a production method of the same.

BACKGROUND ART

Conventional methods for obtaining a zirconia sol include: a method for heat-hydrolyzing a zirconium salt aqueous solution, a method for adding hydrogen peroxide to a zirconium salt aqueous solution and heating the resultant solution, and a method for heating zirconium hydroxide in a basic region.

There is disclosed a method for hydrolyzing a reaction product between zirconium ammonium carbonate and a chelating agent (for example, oxyphenols, amino alcohols, oxyacids, polycarboxylic acids, oxyaldehydes, amino acids, and 62-diketones) (see, Patent Document 1).

There is disclosed a production method of a basic zirconia sol including: maintaining an aqueous suspension containing zirconium hydroxide in a heated state at 80° C. or more until the crystallinity of produced zirconia becomes 80% or more to obtain an aqueous suspension containing crystallized zirconia; and adding to the obtained aqueous suspension, a basic compound containing nitrogen (primary amine, secondary amine, or quaternary ammonium hydroxide), a hydroxide of an alkali metal or alkaline earth metal (see, Patent Document 2).

There is disclosed a production method of a zirconia sol including: causing a precipitate by adding a base to a zirconium salt aqueous solution; adding thereto, a hydroxide of an alkaline earth metal or an aqueous solution thereof to obtain a suspension; and heat-aging the obtained suspension at a temperature of 90 to 200° C. (see, Patent Document 3).

There is disclosed a production method of a zirconia sol including: heating a zirconium salt aqueous solution having a molar ratio of anion/metal of 0.5/1 to 4/1 to 120 to 300° C. and cooling the heated solution to room temperature; and adjusting the pH value of the solution to 2 to 6 (see, Patent Document 4).

There is disclosed a production method of a zirconia sol including: adding hydrogen peroxide to a zirconium salt aqueous solution having a concentration of 0.05 to 2.0 mol/L in an amount which is about half the amount of zirconium in the aqueous solution or more in the molar ratio; heating the resultant solution to 80 to 300° C.; and adding to the solution further a base, such as ammonia, or treating the solution with an ion-exchange resin or the like (see, Patent Document 5).

There is disclosed a production method of zirconia-based fine particles including: heating to 80 to 250° C. and hydrolyzing a zirconium salt aqueous solution to form crystalline zirconia fine particles; separating by precipitation method a part of the thus-formed crystalline zirconia fine particles having a secondary aggregated particle diameter of approximately 1000 Å or more on average from another part of the thus-formed crystalline zirconia fine particles to produce a zirconia sol; and subjecting the produced zirconia sol individually or in combination with another metal compound to a thermal treatment at a temperature of 1000° C. or less (see, Patent Document 6).

Patent Document 1: Japanese Patent Application Publication No. JP-A-3-174325
Patent Document 2: Japanese Patent Application Publication No. JP-A-64-083519
Patent Document 3: Japanese Patent Application Publication No. JP-A-60-176920
Patent Document 4: U.S. Pat. No. 2,984,628 Specifications
Patent Document 5: Japanese Patent Application Publication No. JP-A-58-079818
Patent Document 6: Japanese Patent Application Publication No. JP-A-58-217430

DISCLOSURE OF THE INVENTION

Problems to be Solved by the Invention

Although various production methods of zirconia sol are developed, many of them are production methods in which a zirconium salt is hydrolyzed in an acidic region and heated. In such production methods, a reaction system becomes unstable depending on formed fine particles and is likely to cause a gelation.

Further, by a method in which a zirconium salt is hydrolyzed in an alkali region using ammonium carbonate or an alkali hydroxide, although particles are formed, a large amount of sediment is deposited with time and the reaction system becomes slurry, so that a completely stable sol cannot be obtained.

It is an object of the present invention to provide an acidic zirconia sol having compatibility of particle properties and binding properties; and a production method of the same by subjecting a liquid medium to which a zirconium salt is added to a hydrothermal treatment, using as a raw material, a zirconia sol, preferably an alkaline zirconia sol.

Means for Solving the Problems

According to a first aspect of the present invention, an acidic zirconia sol contains zirconia particles having a particle diameter of less than 20 nm in a content of 10 to 50% by mass, based on the mass of all zirconia particles.

According to a second aspect, a production method of the acidic zirconia sol of the first aspect includes: a first process in which an alkaline zirconia sol (A) and a zirconium salt (B) are mixed in a mass ratio (Bs/As) ranging from 0.2 to 5.0 of a mass of a solid content (Bs) which is converted into an amount of $ZrO_2$ in the zirconium salt (B) to a mass of a solid content (As) which is converted into an amount of $ZrO_2$ in the alkaline zirconia sol (A); and a second process in which the resultant mixture is reacted at 80 to 250° C. to produce an acidic zirconia sol.

According to a third aspect, in the production method of the second aspect, as the zirconium salt (B) in the first process, a zirconium salt aqueous solution or a pH-adjusted zirconium salt aqueous solution is used.

According to a fourth aspect, in the production method of the second aspect, as the zirconium salt (B) in the first process, an aqueous solution of zirconium oxychloride, zirconium oxynitrate, zirconium oxysulfate, zirconium oxyacetate, or a mixture thereof is used.

According to a fifth aspect, in the production method of the second aspect, as the zirconium salt (B) in the first process, an aqueous solution containing a zirconium ammonium carbonate aqueous solution and an acid is used, or after a zirconium ammonium carbonate aqueous solution has been used, the resultant mixture to which an acid is added is used.

According to a sixth aspect, in the production method of the second aspect, as the zirconium salt (B) in the first process, an aqueous solution obtained by adding an alkali to an oxyzirconium salt aqueous solution is used.

According to a seventh aspect, in the production method of the second aspect, as the zirconium salt (B) in the first process, an aqueous solution obtained by anion-exchanging an oxyzirconium salt aqueous solution is used.

According to an eighth aspect, in the production method of the second aspect, as the zirconium salt (B) in the first process, an aqueous solution obtained by adding zirconium hydroxide or zirconium oxycarbonate to an oxyzirconium salt aqueous solution is used.

According to a ninth aspect, in the production method of any one of the second to eighth aspects, the alkaline zirconia sol (A) used in the first process has a pH value of 8 to 12.

According to a tenth aspect, in the production method of any one of the second to eighth aspects, the mixing in the first process is performed by a method of adding the alkaline zirconia sol (A) into an aqueous solution of the zirconium salt (B).

According to an eleventh aspect, in the production method of the ninth aspect, the mixing in the first process is performed by a method of adding the alkaline zirconia sol (A) into an aqueous solution of the zirconium salt (B).

According to a twelfth aspect, in the production method of any one of the second to eighth aspects and the eleventh aspect, the acidic zirconia sol obtained in the second process has a pH value of 0.1 to 5.0.

According to a thirteenth aspect, in the production method of the ninth aspect, the acidic zirconia sol obtained in the second process has a pH value of 0.1 to 5.0.

According to a fourteenth aspect, in the production method of the tenth aspect, the acidic zirconia sol obtained in the second process has a pH value of 0.1 to 5.0.

According to a fifteenth aspect, the production method of any one of the second to eighth aspects, the eleventh, thirteenth, and fourteenth aspects, further includes a third process in which desalting and concentration of a solution of the acidic zirconia sol obtained in the second process is performed.

According to a sixteenth aspect, the production method of the ninth aspect, further includes a third process in which desalting and concentration of a solution of the acidic zirconia sol obtained in the second process is performed.

According to a seventeenth aspect, the production method of the tenth aspect, further includes a third process in which desalting and concentration of a solution of the acidic zirconia sol obtained in the second process is performed.

According to an eighteenth aspect, the production method of the twelfth aspect, further includes a third process in which desalting and concentration of a solution of the acidic zirconia sol obtained in the second process is performed.

Effects of the Invention

The present invention is an acidic zirconia sol obtained by a method in which an alkaline zirconia sol and a zirconium salt are mixed and a liquid medium of the resultant mixture is subjected to a hydrothermal treatment.

The acidic zirconia sol is obtained by a production method including: a first process in which an alkaline zirconia sol (A) and a zirconium salt (B) are mixed in a mass ratio (Bs/As) ranging from 0.2 to 5.0 of a mass of a solid content (Bs) which is converted into an amount of $ZrO_2$ in the zirconium salt (B) to a mass of a solid content (As) which is converted into an amount of $ZrO_2$ in the alkaline zirconia sol (A); and a second process in which the obtained mixture is reacted at 80 to 250° C. to produce an acidic zirconia sol, and contains zirconia particles having a particle diameter of less than 20 nm in a content of 10 to 50% by mass, based on the mass of all zirconia particles. That is, the acidic zirconia sol contains zirconia particles (b) having a particle diameter of less than 20 nm in a content of 10 to 50% by mass, based on the mass of all zirconia particles and the residue (90 to 50% by mass) is zirconia particles (a) having a particle diameter ranging from 20 to 300 nm.

The alkaline zirconia sol (A) used in the first process as a raw material is converted into zirconia particles (a) having a particle diameter ranging from 20 to 300 nm in the acidic zirconia sol. A part of the zirconium salt (B) is converted into zirconia particles (b) having a particle diameter of less than 20 nm in the acidic zirconia sol and the residue thereof is coated on the periphery of the particles of the alkaline zirconia sol (A) as a raw material and converted into zirconia particles (a). Accordingly, the obtained acidic zirconia sol contains zirconia particles (b) having a particle diameter of less than 20 nm in a content of 10 to 50% by mass, based on the mass of all zirconia particles and the residue (90 to 50% by mass) is zirconia particles (a) having a particle diameter ranging from 20 to 300 nm.

The acidic zirconia sol has particle properties and bonding properties and in a cured form of the acidic zirconia sol, large particles and small particles are packed densely, so that the adhesion thereof with an adherend is high and the surface hardness thereof is also high.

As described above, the acidic zirconia sol according to the present invention has such a property that the particle diameter distribution thereof is wide and stable, so that the acidic zirconia sol of the present invention can be applied in many applications, such as a binder for molding processing of various refractories, a binder for various catalysts, an impregnation treatment, a paint for coating, as well as molding processing of an inorganic fiber such as a ceramic fiber, shaping of a mold for a precision casting, a surface treatment of a fiber and a fuel cell.

BEST MODES FOR CARRYING OUT THE INVENTION

The present invention is an acidic zirconia sol containing zirconia particles having a particle diameter of less than 20 nm in a content of 10 to 50% by mass, based on the mass of all zirconia particles.

The production method of the acid zirconia sol according to the present invention includes: a first process in which an alkaline zirconia sol (A) and a zirconium salt (B) are mixed in a mass ratio (Bs/As) of a mass of a solid content (Bs) which is converted into an amount of $ZrO_2$ in the zirconium salt (B) to a mass of a solid content (As) which is converted into an amount of $ZrO_2$ in the alkaline zirconia sol (A) of 0.2 to 5.0; and a second process in which the obtained mixture is reacted at 80 to 250° C. to produce an acidic zirconia sol.

In the first process, it is preferred that an alkaline zirconia sol (A) and a zirconium salt (B) are mixed in a mass ratio (Bs/As) of a mass of a solid content (Bs) which is converted into an amount of $ZrO_2$ in the zirconium salt (B) to a mass of a solid content (As) which is converted into an amount of $ZrO_2$ in the alkaline zirconia sol (A) of 0.2 to 5.0, preferably 0.5 to 3.0, more preferably 0.5 to 2.5.

By setting the value of Bs/As within a range of 0.5 to 3.0, more preferably 0.5 to 2.5, an acidic zirconia sol having more improved shelf stability can be obtained.

As the alkaline zirconia sol (A) used as a raw material of the present invention, an alkaline zirconia sol having a pH value of preferably 8 to 12 can be used. As the alkaline zirconia sol, a known zirconia sol can be used, however, the following alkaline zirconia sols can be preferably used.

The alkaline zirconia sol (A) as a raw material can be obtained by for example a method including: a process in which a zirconium salt is heated at 60 to 110° C. in an aqueous medium containing a carbonate salt of quaternary ammonium, and a process in which the resultant liquid medium is subjected to a hydrothermal treatment at 110 to 250° C.

Examples of the carbonate salt of quaternary ammonium includes $(NR_4)_2CO_3$ and $NR_4HCO_3$ and these compounds can be used individually or in combination thereof. Examples of the quaternary ammonium ion in the carbonate salt of quaternary ammonium include those having an (1 to 18 C) hydrocarbon group and examples of the (1 to 18 C) hydrocarbon group include a saturated or unsaturated chain hydrocarbon group and an alicyclic or aromatic cyclic hydrocarbon group. Examples of the saturated or unsaturated chain hydrocarbon group include a methyl group, an ethyl group, a propyl group, an isopropyl group, an octyl group, a decyl group, an octadecyl group, an ethynyl group and a propenyl group. Examples of the cyclic hydrocarbon group include a phenyl group, a tolyl group, a styryl group, a benzyl group, a naphtyl group, and an anthryl group. Among them, the quaternary ammonium ion has preferably an (1 to 4 C) hydrocarbon group, such as a methyl group, an ethyl group, a propyl group, and an isopropyl group and tetramethyl ammonium hydrogen carbonate composed of four methyl groups is preferred.

When as the above carbonate salt, a carbonate salt containing another ammonium ion than a quaternary ammonium ion is used, also a stable zirconia sol (A) cannot be obtained. For example, when a tertiary ammonium ion such as $(CH_3)_3HN$, a secondary ammonium ion such as $(CH_3)_2H_2N$, a primary ammonium ion such as $(CH_3)H_3N$ and an ammonium ion which becomes $NH_4$ are used, a satisfactorily stable zirconia sol (A) cannot be obtained.

In the production of the alkaline zirconia sol (A) as a raw material, a carbonate salt of a quaternary ammonium ion is commercially available in the form of an aqueous solution having a content of 30 to 60% by mass thereof. Particularly, an aqueous solution having a content of a carbonate salt of quaternary ammonium of 44.5% by mass which is converted into a content of quaternary ammonium hydroxide are easily commercially available. The concentration of a carbonate salt of quaternary ammonium is obtained by a method of measuring in a concentration converted into a concentration of quaternary ammonium hydroxide.

Examples of the zirconium salt used for the production of the alkaline zirconia sol (A) as a raw material include an oxyzirconium salt, such as zirconium oxychloride, and zirconium oxycarbonate. Particularly, zirconium oxycarbonate is preferred.

A carbonate salt of quaternary ammonium is added to an aqueous medium to produce an alkaline aqueous medium. At this time, when instead of a carbonate salt of quaternary ammonium, quaternary ammonium hydroxide is used, a satisfactorily stable zirconia sol cannot be obtained, but be obtained in a slurry in which two phases are separated. Further, for producing an alkali aqueous medium, when another alkali source, such as sodium hydroxide is used, also a stable hydrolyzed product of zirconium salt cannot be obtained, but only an unstable one is obtained and when such an unstable hydrolyzed product is subjected to a hydrothermal treatment, also a stable zirconia sol (A) cannot be obtained. However, it is possible to use another alkali source in combination with a carbonate salt of quaternary ammonium, such as water-soluble inorganic salts (for example, sodium hydroxide, potassium hydroxide, lithium hydroxide, and ammonia), amines (for example, n-propyl amine, monoethanol amine, and triethanol amine), water-soluble organic bases (for example, monomethyltriethyl ammonium hydroxide, and tetramethyl ammonium hydroxide), and other carbonate salts than a carbonate salt of quaternary ammonium (for example, ammonium carbonate). When an alkaline substance is used in combination with a carbonate salt of quaternary ammonium, a mass ratio between a carbonate salt of quaternary ammonium and another alkaline substance is preferably (a carbonate salt of quaternary ammonium):(another alkaline substance)=1:0.01 to 1.

The process (i) for producing the alkaline zirconia sol (A) as a raw material is a process in which in an aqueous medium containing a carbonate salt of quaternary ammonium, a zirconium salt is heated at 60 to 110° C.

An aqueous medium used for the process (i) for producing the alkaline zirconia sol (A) as a raw material, has a pH value of 9 to 12 and a carbonate salt of quaternary ammonium in the aqueous medium has a content of 10 to 35% by mass. The zirconium salt in the aqueous medium has a content as $ZrO_2$ of 5 to 20% by mass. When a heating temperature in the process (i) is 60° C. or less, a satisfactory hydrolysis is not progressed and even when the obtained hydrolyzed product is subjected to a hydrothermal treatment, a stable zirconia sol (A) cannot be obtained. On the other hand, when the process (i) is performed at 110° C. or more, there is no aging time of the hydrolysis, which means that the reaction is transferred directly to a hydrothermal treatment and which is not preferred. The process (i) is performed for usually 1 to 20 hours.

The process (ii) for producing the alkaline zirconia sol (A) as a raw material is a process in which after the process (i), a hydrothermal treatment is performed at 110 to 250° C. When performed at 110° C. or less, the hydrothermal treatment becomes unsatisfactory and when performed at 250° C. or more, a large-scaled apparatus becomes required. The hydrothermal treatment is performed using an autoclave apparatus. The process (ii) is performed usually for 1 to 20 hours. Through the hydrothermal treatment, a hydrolyzed product of a zirconium salt is converted into zirconia particles. The zirconia particles obtained through the process (ii) have a size ranging from 20 to 300 nm as observed by a transmission electron microscope.

A liquid through the process (ii) is an alkali having a pH value of 8 to 12 and can be satisfactorily used as a zirconia sol (A) as it is. However, by performing a process (iii) in which the liquid through the process (ii) is washed with pure water using an ultrafiltration apparatus as an additional process, unnecessary salts can be removed, so that a high-purity alkaline zirconia sol (A) can be obtained.

An alkaline zirconia sol (A) through the process (iii) has physical property values, such as a pH value of 8 to 12, a specific surface area of 50 $m^2$/g to 300 $m^2$/g, a concentration of 30 to 60% by mass, an electric conductivity of 2000 to 10000 μS/cm and a viscosity of 1 to 30 mPa·s. Further, the particle diameter distribution thereof is in the range of 20 to 300 nm.

The alkaline zirconia sol (A) can stably exist under a condition of 50° C. for one month or more.

The alkaline zirconia sol (A) as a raw material through the process (iii) may contain, if desired an additive, such as water-soluble inorganic salts (for example, sodium hydroxide, potassium hydroxide, lithium hydroxide, and ammonia), amines (for example, n-propyl amine, monoethanol amine, and triethanol amine) and water-soluble organic bases (for example, monomethyltriethyl ammonium hydroxide, and tetramethyl ammonium hydroxide).

The alkaline zirconia sol (A) having a pH value ranging from 8 to 12 and a concentration ranging from 1 to 20% by mass can be used in the first process of the present invention.

In the first process for the production of the zirconia sol of the present invention, the zirconium salt (B) is used as a zirconium salt aqueous solution or a pH-adjusted zirconium salt aqueous solution.

In the first process, in a case (B-1) where the zirconium salt (B) is used as an aqueous solution of zirconium oxychloride, zirconium oxynitrate, zirconium oxysulfate, zirconium oxyacetate or a mixture thereof in mixing with the alkaline zirconia sol (A), an acidic aqueous solution of an oxyzirconium salt, such as zirconium oxychloride ($ZrOCl_2$), zirconium oxynitrate ($ZrO(NO_3)_2$), zirconium oxysulfate ($ZrOSO_4$), and zirconium oxyacetate ($ZrO(CH_3COO)_2$) is used. In the case (B-1), an oxyzirconium salt aqueous solution having a pH value of 0.1 to 3.0 and a concentration of 1 to 20% by mass is used.

In the first process, in a case (B-2), the zirconium salt (B) is used as an aqueous solution containing a zirconium ammonium carbonate aqueous solution and an acid in the mixing with the alkaline zirconia sol (A), or the zirconium salt (B) is used as a zirconium ammonium carbonate aqueous solution in the mixing with the alkaline zirconia sol (A) and an acid is added to the resultant mixture. In the case (B-2), there are two cases, such as a case where the zirconium salt (B) is used as an acidic aqueous solution of an oxyzirconium salt obtained by adding an acid to zirconium ammonium carbonate (($NH_4$)$_2ZrO(CO_3)_2$)) in the mixing with the alkaline zirconia sol (A), and a case where the zirconium salt (B) is used as zirconium ammonium carbonate (($NH_4$)$_2ZrO(CO_3)_2$)) in the mixing with the alkaline zirconia sol (A) and to the resultant mixture, an acid is added. Examples of the acid used here include inorganic acids, such as hydrochloric acid, nitric acid, and sulfuric acid and organic acids, such as formic acid, and acetic acid. Particularly, inorganic acids, such as hydrochloric acid, nitric acid, and sulfuric acid are preferred. In the case (B-2), a zirconium ammonium carbonate aqueous solution having a concentration of 1 to 15% by mass is used. An acidic aqueous solution obtained by adding an acid to zirconium ammonium carbonate has a pH value of 0.1 to 4.0. Further, in the case where zirconium ammonium carbonate (($NH_4$)$_2ZrO(CO_3)_2$)) is used in the mixing with the alkaline zirconia sol (A) and to the resultant mixture, an acid is added, the addition of an acid is performed until the pH value of the mixture falls within a pH range of 0.1 to 4.0.

In the first process, in a case (B-3) where the zirconium salt (B) is used as an aqueous solution obtained by adding an alkali to an oxyzirconium salt aqueous solution in the mixing with the alkaline zirconia sol (A), an acidic oxyzirconium salt aqueous solution obtained by adding an alkaline component to an oxyzirconium salt aqueous solution is used. An oxyzirconium salt used here can be one compound or a combination of two or more compounds which is (or are) selected from those described in the case (B-1). Further, examples of the alkaline component include water-soluble inorganic salts such as sodium hydroxide, potassium hydroxide, lithium hydroxide, and ammonia, carbonates such as sodium carbonate and potassium carbonate, and water-soluble organic bases such as monomethyltriethyl ammonium hydroxide, and tetramethyl ammonium hydroxide. In the case (B-3), the solution having a pH value of 0.1 to 4.0 and a concentration of 1 to 15% by mass is used.

In the first process, in a case (B-4) where the zirconium salt (B) is used as an aqueous solution obtained by anion-exchanging an oxyzirconium salt aqueous solution in the mixing with the alkaline zirconia sol (A), an acidic colloidal solution of extremely fine zirconium oxide having a particle diameter of less than 20 nm which is obtained by anion-exchanging an oxyzirconium salt aqueous solution is used. An oxyzirconium salt used here can be one compound or a combination of two or more compounds which is (or are) selected from those described in the case (B-1). Further, the anion-exchange can be performed by contacting the solution with an anion-exchanging resin. For example, the anion-exchange is performed by a method of passing the oxyzirconium salt aqueous solution through a column packed with a hydroxyl group type anion-exchanging resin. In the case (B-4), the extremely fine colloidal solution has a pH value of 0.1 to 4.0 and a concentration of 1 to 20% by mass.

In the first process, in a case (B-5) where the zirconium salt (B) is used as an aqueous solution obtained by adding zirconium hydroxide or zirconium oxycarbonate in the mixing with the alkaline zirconia sol (A), an acidic aqueous solution obtained by adding zirconium hydroxide ($ZrO(OH)_2$) or zirconium oxycarbonate ($ZrOCO_3$) to the oxyzirconium salt aqueous solution described in (B-1) is used. In the case (B-5), the aqueous solution has a pH value of 0.1 to 4.0 and a concentration of 1 to 20% by mass.

In a method of mixing the alkaline zirconia sol (A) and the zirconium salt (B), as the use of the zirconium salt (B), either one method selected from the group of (B-1) to (B-5) or a combination of a plurality of methods selected from the group (B-1) to (B-5), can be used.

Among the above-mentioned methods using the zirconium salt (B), the method (B-2) in which an aqueous solution of the zirconium salt (B) used in mixing with the alkaline zirconia sol (A) is rendered acidic by adding nitric or hydrochloric acid to basic zirconium ammonium carbonate (($NH_4$)$_2ZrO(CO_3)_2$) is used. Also, a method in which an alkali such as ammonia is added to the zirconium salt (B), a method in which a solution is treated with an ion-exchanging resin or a method in which zirconium hydroxide or zirconium oxycarbonate is added ((B-3) to (B-5)) is used. By subjecting the zirconium salt (B) to these treatments ((B-2) to (B-5)), the balance between oxyzirconium ions and acid ions in the zirconium salt (B) is changed and the hydrolysis reaction is accelerated. Further, in the case where an alkali such as ammonia is added to the zirconium salt (B) or in the case where a solution is treated with an ion-exchanging resin, with respect to the zirconium salt obtained by these treatments, it is necessary that the oxyzirconium ion remains to have a positive charge, so that it is desired that a treated solution has a pH value of 5 or less, preferably 4 or less, more preferably 3 or less. In a case where zirconium hydroxide or zirconium oxycarbonate is added to the zirconium salt (B), it is preferred that the mass ratio (Bs/Bs') of a mass of a solid content (Bs) which is converted into an amount of $ZrO_2$ in the zirconium salt (B) to a mass of a solid content (Bs') which is converted into an amount of $ZrO_2$ in zirconium hydroxide or zirconium oxycarbonate is 1.0 to 10.0, preferably 2.0 to 10.0. Further, when a solution obtained by adding zirconium hydroxide or zirconium oxycarbonate to the zirconium salt (B) is heated, the hydrolysis reaction is further accelerated, which is more preferred.

A method in which the zirconium salt (B) is mixed with the alkaline zirconia sol (A) in the state of an aqueous solution is preferred. An aqueous solution of the zirconium salt (B) having a concentration of 1 to 20% by mass is preferably used.

In the first process of the present invention, the alkaline zirconia sol (A) and the zirconium salt (B) are mixed in a mass ratio (Bs/As) of a mass of a solid content (Bs) which is converted into an amount of $ZrO_2$ in the zirconium salt (B) to a mass of a solid content (As) which is converted into an amount of $ZrO_2$ in the alkaline zirconia sol (A) of 0.2 to 5.0.

The mixing of the alkaline zirconia sol (A) and an aqueous solution of the zirconium salt (B) is performed by adding the alkaline zirconia sol (A) to an aqueous solution of the zirconium salt (B).

When the mass ratio Bs/As is less than 0.2, the amount of the alkaline zirconia sol (A) becomes too large and it is feared that the production cost becomes high. On the other hand, when the mass ratio Bs/As is more than 5.0, the content of particles (b) having a particle diameter of less than 20 nm becomes large, so that the stability of the sol is lowered.

In the second process of the present invention, the mixture obtained in the first process is reacted at 80 to 250° C. When the reaction is performed at less than 80° C., it does not become a satisfactory hydrothermal treatment. On the other hand, when the reaction is performed at more than 250° C., a large-scaled reaction apparatus becomes required. The hydrothermal treatment is performed using an autoclave apparatus. The second process is performed for usually 1 to 20 hours. Through the second process, the acidic zirconia sol of the present invention is obtained.

The acidic zirconia sol obtained through the second process has a pH value of 0.1 to 5.0, preferably 0.1 to 2.0.

Although zirconia particles of the alkaline zirconia sol (A) grow a little in an acidic zirconia sol formed through the second process, they are zirconia particles (a) having a particle diameter substantially within the range of 20 to 300 nm. With respect to the zirconium salt (B), a part thereof is converted into zirconia particles (b) having a particle diameter in the range of less than 20 nm in an acidic zirconia sol formed through the second process and another part thereof is coated on particles of the alkaline zirconia sol (A) as a raw material to be converted into zirconia particles (a). The particle diameter can be confirmed using a transmission electron microscope. The ratio between the zirconia particles (a) and the zirconia particles (b) can be determined by a method including: treating a formed acidic zirconia sol using a centrifugal separator so that the resultant supernatant liquid contains the zirconia particles (b); and measuring the solid content in the supernatant liquid. The quantity of zirconia particles (a) can be determined by measuring the solid content in the resultant precipitation.

A part of the zirconia particles (b) in the acidic zirconia sol is zirconia particles having a small particle diameter which can be confirmed using an electron microscope and another part thereof which cannot be confirmed using an electron microscope is extremely fine colloids of zirconium oxide.

The acidic zirconia sol obtained by a production method of the present invention contains the zirconia particles (b) having a particle diameter of less than 20 nm in a content of 10 to 50% by mass, based on the mass of all zirconia particles and the residue (90 to 50% by mass) is the zirconia particles (a) having a particle diameter ranging from 20 to 300 nm.

The zirconia particles (b) having a diameter of less than 20 nm contained in a liquid consist of zirconia particles having a small particle diameter and extremely fine colloids of zirconium oxide which are difficult to be distinguished by an electron microscope. However, even when it is a substance difficult to be distinguished by an electron microscope, by evaporating to dryness a liquid in which the substance is contained, the substance can be confirmed to be zirconium oxide by a X-ray diffraction, so that the substance contained in the acidic zirconia sol which is difficult to be distinguished by an electron microscope, is considered to be extremely fine colloids of zirconium oxide.

A zirconia sol containing the zirconia particles (a) having a particle diameter ranging from 20 to 300 nm can individually stably exist. However, a zirconia sol containing the zirconia particles (b) having a particle diameter of less than 20 nm or extremely fine colloids of zirconium oxide are difficult to exist individually stably and in a production process thereof, a gelation is likely to be caused. Accordingly, by a method of only mixing a zirconia sol containing the zirconia particles (a) having a particle diameter ranging from 20 to 300 nm, a zirconia sol containing the zirconia particles (b) having a particle diameter of less than 20 nm and extremely fine colloids of zirconium oxide, the acidic zirconia sol according to the present invention cannot be obtained.

In the alkaline zirconia sol (A) used in the present invention, the surface of the zirconia particles is charged negatively in an alkali region. On the other hand, in the zirconium salt (B), such as zirconium oxynitrate, an oxyzirconium ion $ZrO^{2+}$ is charged positively. For example, in the first process for mixing the alkaline zirconia sol (A) and the zirconium oxynitrate (B), by adding the alkaline zirconia sol (A) into an aqueous solution of the zirconium oxynitrate (B), oxyzirconium ions $ZrO^{2+}$ of the zirconium oxynitrate (B) are adsorbed on the surface of zirconia particles of the alkaline zirconia sol (A), and in the second process, by subjecting the resultant mixture to a hydrothermal treatment, fine zirconia particles are formed on the surface of the zirconia particles derived from the alkaline zirconia sol (A). A part of these fine zirconia particles is chemically bonded with the zirconia particles derived from the alkaline zirconia sol (A) during the hydrothermal reaction, and by the amount of the fine particles coated on the zirconia particles derived from the alkaline zirconia sol (A), the zirconia particles derived from the alkaline zirconia sol (A) grow as the particles. Another part of the fine zirconia particles becomes apart from the zirconia particles derived from the alkaline zirconia sol (A), and exists individually in the liquid or are bonded to each other by the hydrothermal reaction to grow as the particles.

However, when an aqueous solution of the zirconium oxynitrate (B) is added to the alkaline zirconia sol (A) in the first process, since the aqueous solution of the zirconium oxynitrate (B) is an acidic solution, pH of the alkaline zirconia sol (A) is lowered, so that depending on the case, the alkaline zirconia sol (A) becomes acidic and the negative charge on the surface of the zirconia particles are lowered. Depending on the case, the surface of the zirconia particles becomes charged positively and consequently, the ability of the particle surface to adsorb the oxyzirconium ions $ZrO^{2+}$ derived from the zirconium salt (B) is lowered, so that on the surface of the zirconia particles, the oxyzirconium ions $ZrO^{2+}$ are unlikely to be converted into fine zirconia particles. Rather, the oxyzirconium ions $ZrO^{2+}$ are not fixed to the zirconia particles and float freely in the liquid. The floating oxyzirconium ions are hydrolyzed during the hydrothermal reaction, so that fine zirconia particles and extremely fine colloids are likely to be gelated each other.

However, so long as the problem of such a gelation can be overcome, even by a method of adding an aqueous solution of the zirconium salt (B) to the alkaline zirconia sol (A), the present invention can be performed. That is, for suppressing such a gelation, by a method in which under a condition of stirring with a high revolution number using an impeller having a shearing force, such as a disper, an aqueous solution of, for example the zirconium oxynitrate (B) is added to the alkaline zirconia sol (A), an acidic zirconia sol can be produced. By adding the zirconium salt (B) under such a condition, the oxyzirconium ions $ZrO^{2+}$ are likely to be adsorbed uniformly on the surface of the zirconia particles, so that fine zirconia particles and extremely fine colloids are unlikely to be gelated each other.

According to the present invention, the obtained acidic zirconia sol has a wider particle diameter distribution than that of the alkaline zirconia sol used as a raw material, and is an acidic zirconia sol in which large particle zirconia, small particle zirconia and zirconia extremely fine colloids are mixed present. While an acidic zirconia sol consisting of only small particle zirconia and zirconia extremely fine colloids has low stability, the acidic zirconia sol according to the present invention containing large particle zirconia, and small particle zirconia and zirconia extremely fine colloids which have been formed in the presence of the large particle zirconia has high stability.

By heat-hydrolyzing the zirconium salt (B) in the presence of the alkaline zirconia sol (A) as a raw material, the acidic zirconia sol of the present invention containing the large zirconia particles (a) and the small zirconia particles (b) containing zirconium oxide extremely fine colloids can be obtained.

Even when the second process of the present invention is performed without using the alkaline zirconia sol (A) as a raw material and with using only an aqueous solution of the zirconium salt (B), the eventual product is only a gel-shaped substance and a stable zirconia sol cannot be produced.

In the present invention, after the second process, the third process for the desalting and the concentration can be performed. As the desalting, there can be mentioned a method using an ultrafiltration membrane and by this method, while washing with water, the acidic zirconia sol can be concentrated to a concentration of 10 to 40% by mass.

The obtained acidic zirconia sol is a zirconia sol having a pH value of 0.1 to 5.0, preferably 1.5 to 4.5.

The pH value of the acidic zirconia sol can be both lowered by adding an acidic substance, such as hydrochloric acid, nitric acid, and acetic acid as a pH adjuster and elevated by adding an alkaline substance, such as sodium hydroxide, ammonia, and quaternary ammonium to convert the acidic zirconia sol to an alkaline zirconia sol.

EXAMPLES

Measuring Method of Content of Zirconia Particles Having Diameter Range of Less than 20 nm in Acidic Zirconia Sol By diluting the acidic zirconia sol with pure water, 30 g of a diluted liquid having a content as $ZrO_2$ of 0.5% by mass was prepared. Two aliquots of 15 g of the diluted liquid were weighed and taken into an individual predetermined vessel.

The vessel containing the diluted liquid was subjected to a centrifugal separator (trade name: SRX-201; manufactured by Tomy Seiko Co., Ltd.) to subject the diluted liquid to a centrifugal separation at 20000 rpm for one hour. After the centrifugal separation treatment, the sample in the vessel was separated into two parts, such as a part of a substantially colorless and transparent supernatant and a part of precipitations with white color. The part of a supernatant was observed using a transmission electron microscope, there were observed only zirconia particles having a diameter of less than 20 nm and no zirconia particle having a diameter of 20 nm or more was observed. Thereafter, all amount of the supernatant were recovered and the mass of the recovered liquid was measured. All amount of the recovered liquid were transferred into a porcelain crucible and, water was evaporated at 100° C. from the liquid. Thereafter, the crucible was baked for 30 minutes in an electric oven of 800° C., and after cooled, the mass of the residue in the crucible was weighed. All of zirconia particles having a particle diameter of less than 20 nm were defined to be present in the supernatant and from the following equation, the content of zirconia particles having a particle diameter range of less than 20 nm was calculated.

Content of zirconia particles having a particle diameter range of less than 20 nm (%)=[(Residue of supernatant after calcination)/(Solid content converted into $ZrO_2$ in the diluted liquid charged into the vessel)]×100

Example 1

Into a 3 L glass-made vessel, 342.9 g of a zirconium oxynitrate solution (manufactured by Daiichi Kigenso Kagaku Kogyo Co., Ltd) having a content of 25.0% by mass as $ZrO_2$ and 1976.8 g of pure water were charged. While mixing and stirring the resultant mixture solution, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:4, and a pH value of 0.9 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.7. Next, the sol was washed using an ultrafiltration apparatus while adding pure water gradually to the sol and was concentrated to thereby obtain an acidic zirconia sol having a content of 20.3% by mass as $ZrO_2$. The obtained sol had a pH value of 3.5, a B type viscosity of 982 mPa·s (measured with No. 3 rotor at after 60 sec), a content of $NO_3$ of 3.5% by mass, a particle diameter of 3 to 300 nm as measured by a transmission electron microscope, a particle diameter of 108 nm as measured by a dynamic light scattering method, and a content of zirconia particles having a particle diameter range of less than 20 nm in all zirconia particles of 46%.

Further, the yield of a $ZrO_2$ solid content of the zirconia sol was 90.4%, relative to 100% of a $ZrO_2$ solid content of the mixture in the first process.

Example 2

Into a 3 L glass-made vessel, 342.9 g of a zirconium oxynitrate solution (manufactured by Daiichi Kigenso Kagaku Kogyo Co., Ltd) having a content of 25.0% by mass as $ZrO_2$ and 1976.8 g of pure water were charged. While mixing and stirring the resultant mixture solution, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:4, and a pH value of 0.9 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.7. Next, the sol was washed using an ultrafiltration apparatus while adding pure water gradually to the sol and was concentrated to thereby obtain an acidic zirconia sol having a content of 23.2% by mass as $ZrO_2$. The obtained sol had a pH value of 2.3, a B type viscosity of 18.6 mPa·s (measured with No. 1 rotor at after 60 sec), a content of $NO_3$ of 4.3% by mass, a particle diameter of 3 to 300 nm as measured by a transmission electron microscope, a particle diameter of 85 nm as measured by a dynamic light scattering method, a content of zirconia particles having a particle diameter range of less than 20 nm in all zirconia particles of 47%.

Further, the yield of a $ZrO_2$ solid content of the zirconia sol was 96.0%, relative to 100% of a $ZrO_2$ solid content of the mixture in the first process.

Example 3

Into a 3 L glass-made vessel, 240.0 g of a zirconium oxynitrate solution (manufactured by Daiichi Kigenso Kagaku Kogyo Co., Ltd) having a content of 25.0% by mass as $ZrO_2$ and 2019.5 g of pure water were charged. While mixing and stirring the resultant mixture solution, thereinto 140.5 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:10, and a pH value of 1.2 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 1.0. Next, the sol was washed using an ultrafiltration apparatus while adding pure water gradually to the sol and was concentrated to thereby obtain an acidic zirconia sol having a content of 25.6% by mass as $ZrO_2$. The obtained sol had a pH value of 3.3, a B type viscosity of 13.0 mPa·s (measured with No. 1 rotor at after 60 sec), a content of $NO_3$ of 3.3% by mass, a particle diameter of 3 to 300 nm as measured by a transmission electron microscope, a particle diameter of 86 nm as measured by a dynamic light scattering method, a content of zirconia particles having a particle diameter range of less than 20 nm in all zirconia particles of 31%.

Further, the yield of a $ZrO_2$ solid content of the zirconia sol was 97.3%, relative to 100% of a $ZrO_2$ solid content of the mixture in the first process.

The sol was preserved at room temperature for 3 months and at this time, the sol had a B type viscosity of 34.8 mPa·s (measured with No. 1 rotor at after 60 sec).

Example 4

Into a 3 L glass-made vessel, 400.0 g of a zirconium oxynitrate solution (manufactured by Daiichi Kigenso Kagaku Kogyo Co., Ltd) having a content of 25.0% by mass as $ZrO_2$ and 1953.2 g of pure water were charged. While mixing and stirring the resultant mixture solution, thereinto 46.8 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:2, and a pH value of 1.0 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.7. Next, the sol was washed using an ultrafiltration apparatus while adding pure water gradually to the sol and was concentrated to thereby obtain an acidic zirconia sol having a content of 17.3% by mass as $ZrO_2$. The obtained sol had a pH value of 3.3, a B type viscosity of 193 mPa·s, a content of $NO_3$ of 3.7% by mass, a particle diameter of 3 to 300 nm as measured by a transmission electron microscope, a particle diameter of 96 nm as measured by a dynamic light scattering method, a content of zirconia particles having a particle diameter range of less than 20 nm in all zirconia particles of 50%.

Further, the yield of a $ZrO_2$ solid content of the zirconia sol was 96.9%, relative to 100% of a $ZrO_2$ solid content of the mixture in the first process.

The sol was preserved at room temperature for 3 months and at this time, the sol had a B type viscosity of 7500 mPa·s (measured with No. 4 rotor at after 60 sec).

Example 5

Into a 3 L glass-made vessel, 342.9 g of a zirconium oxynitrate solution (manufactured by Daiichi Kigenso Kagaku Kogyo Co., Ltd) having a content of 25.0% by mass as $ZrO_2$ and 1976.8 g of pure water were charged. While mixing and stirring the resultant mixture solution, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:4, and a pH value of 0.9 (first process). The mixture was transferred into a glass-lining coated autoclave and was subjected to a hydrothermal synthesis reaction while stirring the mixture at 140° C. for 8 hours (second process). The substance obtained after the reaction had no gel and was completely converted into a sol. The substance had a content of 5% by mass as $ZrO_2$ and a pH value of 0.7. Next, the sol was washed using an ultrafiltration apparatus while adding pure water gradually to the sol and was concentrated to thereby obtain an acidic zirconia sol having a content of 20.5% by mass as $ZrO_2$. The obtained sol had a pH value of 3.4, a B type viscosity of 146 mPa·s (measured with No. 2 rotor at after 60 sec), a content of $NO_3$ of 3.3% by mass, a particle diameter of 3 to 300 nm as measured by a transmission electron microscope, a particle diameter of 104 nm as measured by a dynamic light scattering method, a content of zirconia particles having a particle diameter range of less than 20 nm in all zirconia particles of 47%.

Further, the yield of a $ZrO_2$ solid content of the zirconia sol was 97.3%, relative to 100% of a $ZrO_2$ solid content of the mixture in the first process.

The sol was preserved at room temperature for 3 months and at this time, the sol had a B type viscosity of 586 mPa·s (measured with No. 3 rotor at after 60 sec).

Example 6

Into a 3 L glass-made vessel, 96.0 g of a zirconium oxynitrate solution (manufactured by Daiichi Kigenso Kagaku Kogyo Co., Ltd) having a content of 25.0% by mass as $ZrO_2$ and 2079.2 g of pure water were charged. While mixing and stirring the resultant mixture solution, thereinto 224.8 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 1:4, and a pH value of 2.0 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 1.6. Next, the sol was washed using an ultrafiltration apparatus while adding pure water gradually to the sol and was concentrated to thereby obtain an acidic zirconia sol having a content of 30.4% by mass as $ZrO_2$. The obtained sol had a pH value of 3.5, a B type viscosity of 7.8 mPa·s (measured with No. 2 rotor at after 60 sec), a content of $NO_3$ of 2.0% by mass, a particle diameter of 3 to 300 nm as measured by a transmission electron microscope, a particle diameter of 76 nm as measured by a dynamic light scattering method, a content of zirconia particles having a particle diameter range of less than 20 nm in all zirconia particles of 20%.

Further, the yield of a $ZrO_2$ solid content of the zirconia sol was 98.7%, relative to 100% of a $ZrO_2$ solid content of the mixture in the first process.

Example 7

Into a 3 L glass-made vessel, 392.4 g of a zirconium ammonium carbonate solution (manufactured by Daiichi Kigenso Kagaku Kogyo Co., Ltd) having a content of 13.1% by mass as $ZrO_2$ and 1000.9 g of pure water were charged. While mixing and stirring the resultant mixture solution, thereinto 48.2 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes. Into the mixture, while stirring the mixture, a nitric acid aqueous solution of 10% by mass was added intermittently. Nitric acid was gradually added and at the time when the pH value of the mixture became around 6, the viscosity thereof was rapidly elevated, so that a large amount of a gel was formed. Thereafter, further nitric acid was added and the viscosity was gradually lowered, so that the formation of the gel became suppressed. Totally 950.4 g of a nitric acid solution of 10% by mass were added to the mixture and the resultant mixture was stirred for 1 hour, to thereby prepare the raw material mixture. The mixture had a content of 3% by mass as $ZrO_2$, a mixing ratio (solid content ratio) of a solid content of zirconium ammonium carbonate converted into $ZrO_2$ and a solid content of alkaline zirconia sol converted into $ZrO_2$ of 10:4 and a pH value of 1.7, and the gel formed in the raw material mixing step has almost disappeared (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 3% by mass as $ZrO_2$ and a pH value of 1.1. Next, the sol was washed using an ultrafiltration apparatus while adding pure water gradually to the sol and was concentrated to thereby obtain an acidic zirconia sol having a content of 20.2% by mass as $ZrO_2$. The obtained sol had a pH value of 3.2, a B type viscosity of 4.8 mPa·s (measured with No. 2 rotor at after 60 sec), a content of $NO_3$ of 1.9% by mass, a particle diameter of 3 to 300 nm as measured by a transmission electron microscope, a particle diameter of 110 nm as measured by a dynamic light scattering method, a content of zirconia particles having a particle diameter range of less than 20 nm in all zirconia particles of 17%.

Further, the yield of a $ZrO_2$ solid content of the zirconia sol was 98.7%, relative to 100% of a $ZrO_2$ solid content of the mixture in the first process.

Example 8

Into a 3 L glass-made vessel, 481.4 g of a zirconium oxychloride solution (manufactured by Daiichi Kigenso Kagaku Kogyo Co., Ltd) having a content of 17.7% by mass as $ZrO_2$ and 1838.3 g of pure water were charged. While mixing and stirring the resultant mixture solution, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxychloride converted into $ZrO_2$ and a solid content of alkaline zirconia sol converted into $ZrO_2$ of 10:4, and a pH value of 0.6 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.4. Next, the sol was washed using an ultrafiltration apparatus while adding pure water gradually to the sol and was concentrated to thereby obtain an acidic zirconia sol having a content of 27.5% by mass as $ZrO_2$. The obtained sol had a pH value of 2.9, a B type viscosity of 6.0 mPa·s (measured with No. 1 rotor at after 60 sec), a content of Cl of 1.0% by mass, a particle diameter of 3 to 300 nm as measured by a transmission electron microscope, a particle diameter of 102 nm as measured by a dynamic light scattering method, a content of zirconia particles having a particle diameter range of less than 20 nm in all zirconia particles of 11%.

Further, the yield of a $ZrO_2$ solid content of the zirconia sol was 95.4%, relative to 100% of a $ZrO_2$ solid content of the mixture in the first process.

Example 9

Into a 3 L glass-made vessel, 244.8 g of a zirconium oxynitrate solution (manufactured by Daiichi Kigenso Kagaku Kogyo Co., Ltd) having a content of 25.0% by mass as $ZrO_2$ and 1414.1 g of pure water were charged. While mixing and stirring the resultant mixture solution, thereinto 55.1 g (in total) of zirconium oxycarbonate powder (manufactured by Daiichi Kigenso Kagaku Kogyo Co., Ltd) having a content of 44.5% by mass as $ZrO_2$ was gradually charged. After the completion of the charging, while stirring, the resultant mixture was heated to 100° C. and was aged at 100° C. for 3 hours. After the completion of the aging, while stirring, the mixture was cooled. Thereafter, further while mixing and stirring the mixture, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ and 605.7 g of pure water was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate and zirconium oxycarbonate converted into $ZrO_2$ and a solid content of alkaline zirconia sol converted into $ZrO_2$ of 10:4, and a pH value of 1.0 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.8. Next, the sol was washed using an ultrafiltration apparatus while adding pure water gradually to the sol and was concentrated to thereby obtain an acidic zirconia sol having a content of 19.6% by mass as $ZrO_2$. The obtained sol had a pH value of 3.5, a B type viscosity of 356 mPa·s (measured with No. 2 rotor at after 60 sec), a content of $NO_3$ of 3.5% by mass, a particle diameter of 3 to 300 nm as measured by a transmission electron microscope, a particle diameter of 87 nm as measured by a dynamic light scattering method, a content of zirconia particles having a particle diameter range of less than 20 nm in all zirconia particles of 49%.

Further, the yield of a $ZrO_2$ solid content of the zirconia sol was 97.4%, relative to 100% of a $ZrO_2$ solid content of the mixture in the first process.

Comparative Example 1

Into a 3 L glass-made vessel, 342.9 g of a zirconium oxynitrate solution (manufactured by Daiichi Kigenso Kagaku Kogyo Co., Ltd) having a content of 25.0% by mass as $ZrO_2$ and 1942.8 g of pure water were charged. While mixing and stirring the resultant mixture solution, thereinto 114.3 g of an acidic zirconia sol (manufactured by Nissan Chemical Industries, Ltd.; having a particle diameter of 20 to 300 nm as measured by a transmission electron microscope, a particle diameter of 95 nm as measured by a dynamic light scattering method, pH of 4.2) having a content of 30.0% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of acidic zirconia sol converted into $ZrO_2$ of 10:4, and a pH value of 1.0. The mixture was transferred into a glass-lining coated autoclave and was subjected to a hydrothermal synthesis reaction while stirring the mixture at 140° C. for 3 hours. The substance obtained after the reaction had no gel and was completely converted into a sol. The substance had a content of 5% by mass as $ZrO_2$ and a pH value of 0.7. Next, the sol was washed using an ultrafiltration apparatus while adding pure water gradually to the sol and was concentrated to thereby obtain an acidic zirconia sol having a content of 21.2% by mass as $ZrO_2$. The obtained sol had a pH value of 3.2, a B type viscosity of 32.5 mPa·s (measured with No. 2 rotor at after 60 sec), a content of $NO_3$ of 3.7% by mass, a particle diameter of 3 to 300 nm as measured by a transmission electron microscope, a particle diameter of 110 nm as measured by a dynamic light scattering method. Further, the yield of a $ZrO_2$ solid content of the zirconia sol was 98.7%, relative to 100% of a $ZrO_2$ solid content of the mixture in the first process.

However, a content of zirconia particles having a particle diameter range of less than 20 nm in all zirconia particles was 52%.

Further, when the particles were observed by a transition electron microscope, many aggregated particles formed by zirconia particles having a particle diameter of less than 20 nm gathering together were observed. It is considered that this is because the surface of the zirconia sol particles was charged positively and the oxyzirconium ion $ZrO^{2+}$ derived from the zirconium salt (B) was hardly adsorbed to the surface of the zirconia particles and floated freely in the liquid, so that the oxyzirconium ion $ZrO^{2+}$ was hydrolyzed during the hydrothermal reaction and fine zirconia particles and extremely fine colloids were reacted with each other to grow as particles.

The acidic zirconia sol was preserved at normal temperature for 40 days and at this time, the sol had a B type viscosity of 149 mPa·s (measured with No. 2 rotor at after 60 sec).

Comparative Example 2

Into a 3 L glass-made vessel, 342.9 g of a zirconium oxynitrate solution (manufactured by Daiichi Kigenso Kagaku Kogyo Co., Ltd) having a content of 25.0% by mass as $ZrO_2$ and 1976.8 g of pure water were charged. While mixing and stirring the resultant mixture solution, thereinto 80.3 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:4, and a pH value of 0.9. Next, without subjecting the mixture to a heating treatment, the mixture was washed using an ultrafiltration apparatus while adding pure water gradually to the mixture and was concentrated to thereby obtain an acidic zirconia sol having a content of 13.8% by mass as $ZrO_2$. The obtained sol had a pH value of 2.7, a B type viscosity of 59.5 mPa·s (measured with No. 1 rotor at after 60 sec), a content of $NO_3$ of 2.9% by mass, a particle diameter of 3 to 300 nm as measured by a transmission electron microscope, a particle diameter of 129 nm as measured by a dynamic light scattering method.

Further, the yield of a $ZrO_2$ solid content of the zirconia sol was 82.8%, relative to 100% of a $ZrO_2$ solid content of the raw material mixture.

However, a content of zirconia particles having a particle diameter range of less than 20 nm in all zirconia particles was 62%.

Further, the sol maintained a sol state thereof so long as the concentration of $ZrO_2$ was low, however, when $ZrO_2$ was concentrated to 15% by mass or more, the sol was rapidly thickened and converted into a gel. It is considered that this is because, since the heating treatment was not performed, the zirconia particles having a particle diameter range of less than 20 nm (b) were not crystallized to a certain extent and the surface state thereof was chemically active, so that the interaction between small particles and extremely fine colloids was high and the sol tended easily to be thickened.

Comparative Example 3

Into a 3 L glass-made vessel, 480.0 g of a zirconium oxynitrate solution (manufactured by Daiichi Kigenso Kagaku Kogyo Co., Ltd) having a content of 25.0% by mass as $ZrO_2$ and 1920.0 g of pure water were charged, to thereby prepare the raw material mixture. The mixture contained 5% by mass of $ZrO_2$ and had a pH value of 0.6. The mixture was transferred into a glass-lining coated autoclave and was subjected to a hydrothermal synthesis reaction while stirring the mixture at 140° C. for 3 hours. The obtained reaction product was in a gel state and could not be converted into a sol.

Comparative Example 4

Into a 3 L glass-made vessel, 43.6 g of a zirconium oxynitrate solution (manufactured by Daiichi Kigenso Kagaku Kogyo Co., Ltd) having a content of 25.0% by mass as $ZrO_2$ and 2100.9 g of pure water were charged. While mixing and stirring the resultant mixture solution, thereinto 255.5 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 1:10, and a pH value of 2.5 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 2.2. Next, the sol was washed using an ultrafiltration apparatus while adding pure water gradually to the sol and was concentrated to thereby obtain an acidic zirconia sol having a content of 26.6% by mass as $ZrO_2$. The obtained sol had a pH value of 3.3, a B type viscosity of 18.0 mPa·s (measured with No. 1 rotor at after 60 sec), a content of $NO_3$ of 1.2% by mass, a particle diameter of 3 to 300 nm as measured by a transmission electron microscope, a particle diameter of 86 nm as measured by a dynamic light scattering method.

Further, the yield of a $ZrO_2$ solid content of the zirconia sol was 98.5%, relative to 100% of a $ZrO_2$ solid content of the mixture in the first process.

However, a content of zirconia particles having a particle diameter range of less than 20 nm in all zirconia particles was 9%.

Since the obtained acidic zirconia sol had a low content of zirconia particles having a particle diameter of less than 20 nm, it was near to a conventional acidic zirconia sol and could not exhibit binder properties.

Comparative Example 5

Into a 3 L glass-made vessel, 436.4 g of a zirconium oxynitrate solution (manufactured by Daiichi Kigenso Kagaku Kogyo Co., Ltd) having a content of 25.0% by mass as $ZrO_2$ and 1938.1 g of pure water were charged. While mixing and stirring the resultant mixture solution, thereinto 25.5 g of an alkaline zirconia sol (having a particle diameter of 20 to 300 nm as measured by a transmission electron microscope, a particle diameter of 82 nm as measured by a dynamic light scattering method, pH of 9.5 and a content of tetramethylammonium hydroxide (TMAH) of 1.0% by mass) having a content of 42.7% by mass as $ZrO_2$ was charged and the resultant mixture was stirred for 30 minutes, to thereby prepare the raw material mixture. The mixture had a content of 5% by mass as $ZrO_2$, a mixing ratio (solid content ratio) of a solid content of zirconium oxynitrate converted into $ZrO_2$ and a solid content of alkaline zirconia sol converted into $ZrO_2$ of 10:1, and a pH value of 0.8 (first process). The mixture was transferred into a glass-lining coated autoclave and was subjected to a hydrothermal synthesis reaction while stirring the mixture at 140° C. for 3 hours (second process). The substance obtained after the reaction had no gel and was completely converted into a sol. The substance had a content of 5% by mass as $ZrO_2$ and a pH value of 0.6. Next, the sol was washed using an ultrafiltration apparatus while adding pure water gradually to the sol and was concentrated to thereby obtain an acidic zirconia sol having a content of 9.1% by mass as $ZrO_2$. The obtained sol had a pH value of 3.2, a B type viscosity of 74.0 mPa·s (measured with No. 1 rotor at after 60 sec), a content of $NO_3$ of 1.9% by mass, a particle diameter of 3 to 300 nm as measured by a transmission electron microscope, a particle diameter of 96 nm as measured by a dynamic light scattering method.

Further, the yield of a $ZrO_2$ solid content of the zirconia sol was 96.4%, relative to 100% of a $ZrO_2$ solid content of the mixture in the first process.

However, a content of zirconia particles having a particle diameter range of less than 20 nm in all zirconia particles was 53%. The amount of small particles was larger than that of large particles, so that when the acidic zirconia sol has a high concentration, a stable sol cannot be obtained.

As described in Comparative Example 1, when an acidic zirconia sol instead of the alkaline zirconia sol (A) and zirconium oxynitrate corresponding to the zirconium salt (B) were used, the obtained zirconia sol had a content of zirconia particles having a particle diameter range of less than 20 nm of more than 50% and in the obtained zirconia sol, a large amount of an aggregated structure of small particles having a particle diameter of less than 20 nm was observed, so that the acidic zirconia sol according to the present invention could not be obtained.

As described in Comparative Example 2, even when the alkaline zirconia sol (A) and zirconium oxynitrate corresponding to the zirconium salt (B) were used, when in the following process, the hydrothermal reaction at 80 to 250° C. was not performed, the obtained zirconia sol had a content of zirconia particles having a particle diameter range of less than 20 nm of more than 50% and the surface of the formed small particles having a particle diameter of less than 20 nm had activity, so that by these small particles, a gelation was induced.

As described in Comparative Example 3, when the alkaline zirconia sol (A) was not used and only zirconium oxynitrate corresponding to the zirconium salt (B) was used, as described in "Background Art", the salt should be hydrolyzed in an acidic region and heated to produce fine particles, however, the reaction system became unstable and a gelation was caused.

In Examples 1 to 9 of the present invention, in the presence of the alkaline zirconia sol (A), by hydrolyzing a zirconium salt, large particles derived from the alkaline zirconia sol (A) and small particles derived from the hydrolysis of the zirconium salt (B) were present in the ratio B/A of 0.2 to 5.0, so that a stable acidic zirconia sol having a wide range of particle diameter could be obtained.

However, as described in Comparative Example 4, when the ratio B/A is less than 0.2, the content of zirconia particles having a particle diameter range of less than 20 nm becomes less than 10% and a desired acidic zirconia sol cannot be obtained. On the other hand, as described in Comparative Example 5, when the ratio B/A is more than 5.0, the content of zirconia particles having a particle diameter range of less than 20 nm becomes more than 50% and a desired acidic zirconia sol cannot also be obtained. When the obtained acidic zirconia sol has a high concentration, it cannot be a stable sol.

INDUSTRIAL APPLICABILITY

The acidic zirconia sol according to the present invention has a wide particle diameter distribution and is stable, so that it can be applied in many applications, such as a binder for molding processing of various refractories, a binder for various catalysts, an impregnation treatment, a paint for coating, as well as molding processing of an inorganic fiber such as a ceramic fiber, shaping of a mold for a precision casting, a surface treatment of a fiber, and a fuel cell.

The invention claimed is:

1. An acidic zirconia sol having a particle diameter of from 76 nm to 108 nm as measured by a dynamic light scattering method comprising:
    zirconia particles (a) having a particle diameter ranging from 20 to 300 nm in a content of 90 to 50% by mass, based on the mass of all zirconia particles; and
    zirconia particles (b) having a particle diameter of less than 20 nm in a content of 10 to 50% by mass, based on the mass of all zirconia particles.

* * * * *